J. Marchbank,
Brush.
No. 4,151. Reissued Oct. 11. 1870.
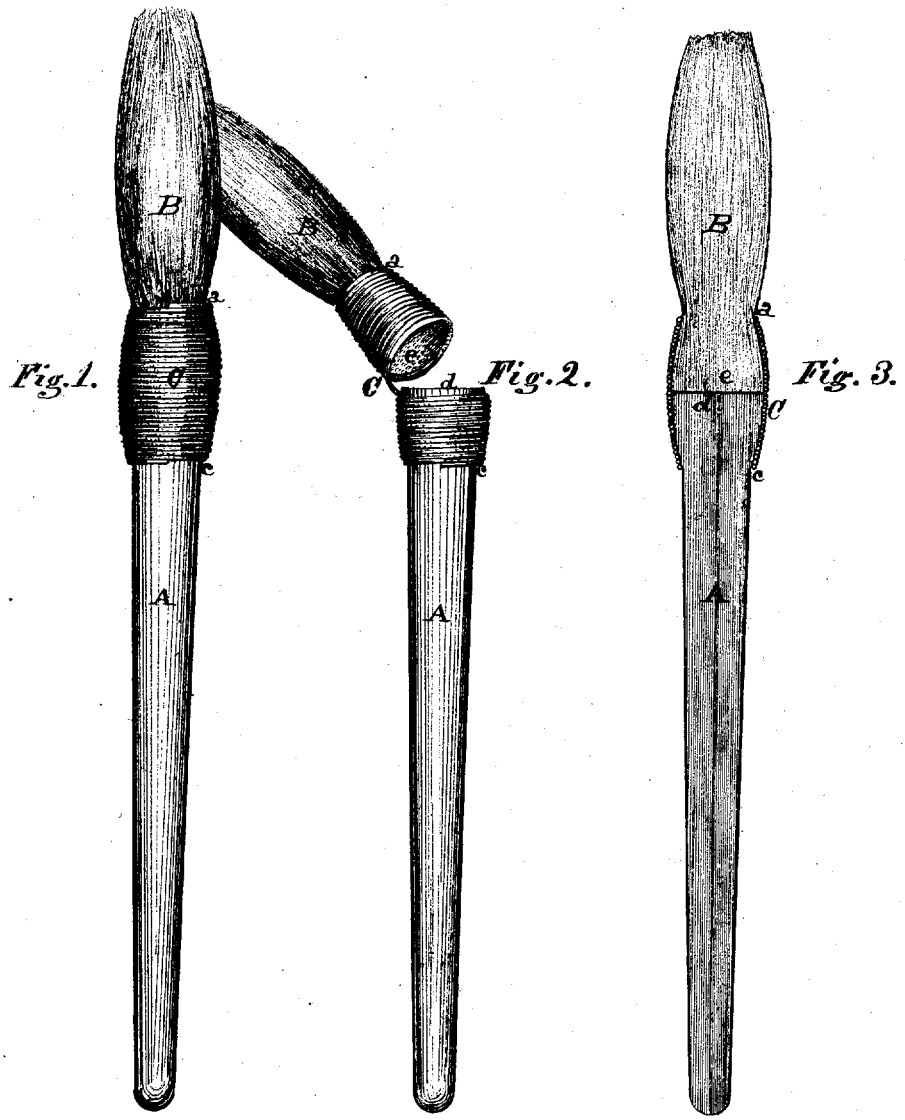
Witnesses { Samuel Minnee
Henry N. Mygatt
J. Marchbank.
by Alex. Selkirk his Attorney
Inventor.
N. PETERS, PHOTO-LITHOGRAPHER, WASHINGTON, D. C.

United States Patent Office.

JAMES McQUIDE, OF LANSINGBURG, NEW YORK, ASSIGNEE OF JOHN MARCHBANK.

Letters Patent No. 59,850, dated November 20, 1866; reissue No. 4,151, dated October 11, 1870.

IMPROVEMENT IN BRUSHES.

The Schedule referred to in these Letters Patent and making part of the same.

*To all whom it may concern:*

Be it known that JOHN MARCHBANK, of Lansingburg, in the county of Rensselaer and State of New York, did invent a new and useful Improvement in Paint and other similar Brushes; and I do hereby declare that the following is a description thereof, reference being had to the accompanying drawing, in which—

Figure 1 represents perspective view of a brush, completed, embodying my invention.

Figure 2 represents a side view of a brush, in the direction of its length, showing the ferrule opened or broken, and illustrating the arrangement of the bristles and handle, each within their respective parts of the ferrule.

Figure 3 represents a longitudinal section of a brush, embodying this invention, and illustrates the manner in which the ferrule operates, with the handle and bristles to connect the same, when the brush is completed.

The nature of the invention consists of the combination of a metal ferrule, of a kegging or barrel form, with the usual handle and bristles, in such a manner that the contracting ends of the ferrule, pinching on the handle and the bristles at their proper points, will act with the bilge of the said ferrule, holding the enlarged portions of the said handle and bristles, and be capable of securing the handle with the bristles in a very firm and durable manner.

To enable others skilled in the art to make and use this invention, I will proceed to describe it in reference to the drawing and the letters of reference marked thereon, the same letters indicating like or similar parts.

In the drawing—

A represents the handle of the brush.

B represents the bristles.

C represents the ferrule, used for connecting the said bristles with the said handle.

The said ferrule C is made of metal, and preferably of coiled wire, having their several coils soldered together, so as to make the whole as one piece.

To the said ferrule C a kegging form is given, as shown in figs. 1 and 3; that is to say, I form the ferrule is formed in such a manner that its two ends will be of smaller diameter than the diameter of the center or bilge of the said ferrule.

When thus constructed and properly applied to the handle and bristles, as in figs. 1 and 3, the contracted ends of the ferrule C will pinch on the bristles at *a*, and the wood of the handle at *c*, while the bilge of the said ferrule will inclose the enlarged or thickened portions *d* of the handle, and *e* of the brush, as shown in figs. 2 and 3, and thus this kegging-formed ferrule be made to unite firmly the bristles with the handle in a durable and firm manner.

To apply the said ferrule to unite the bristles to the handle, the said ferrule is parted at or near its bilge, as shown in fig. 2. The mass of bristles, B, to be used to form the brush part, is then inserted in one of the halves of the said parted ferrule. The smaller portion of the handle is then passed through the second half of the ferrule, and drawn close down to its neck. The usual resin or other cement is then applied freely to the end of the mass of bristles within the first half of the ferrule, and while the said cement is yet hot the two halves of the said ferrule are brought together in the same relative position they were before being parted, when they are united by soldering, when the ferrule will appear, and be, in fact, one continuous piece, and the same as if it had not been parted, and as shown in figs. 1 and 3.

While by this invention the cost of the brush is not increased, the brush is made stronger in its connection, and rendered impervious to the action of water at that point.

Having described the invention,

What is claimed, and desired to be secured by Letters Patent, is—

1. In a brush, the combination of the ferrule C, of kegging form, with the handle A and bristles B, substantially as and for the purpose set forth.

2. The coiled-wire ferrule C, enlarged at its center, and adapted to admit of the insertion of the bristles B and handle A from its partings at the bilge, substantially as and for the purpose set forth.

JAMES McQUIDE,
*Assignee of Inventor.*

Witnesses:
ALEX. SELKIRK,
CHAS. SELKIRK.